United States Patent [19]

Ishikawa et al.

[11] Patent Number: 5,599,778
[45] Date of Patent: Feb. 4, 1997

[54] ORGANOSILOXANE LUBRICANT COMPOSITIONS

[75] Inventors: Hiroki Ishikawa; Tsutomu Naganawa; Isao Ona, all of Chiba Perfecture, Japan

[73] Assignee: Dow Corning Toray Silicone Co., Ltd., Tokyo, Japan

[21] Appl. No.: 533,894

[22] Filed: Sep. 26, 1995

Related U.S. Application Data

[63] Continuation-in-part of Ser. No. 378,332, Jan. 26, 1995.

[30] Foreign Application Priority Data

Jan. 28, 1994 [JP] Japan .................. 6-025990

[51] Int. Cl.$^6$ ............ C10M 105/76; C10M 107/50
[52] U.S. Cl. .................................... 508/208
[58] Field of Search .............. 252/49.6; 556/449; 106/38.22, 287.14, 287.16

[56] References Cited

U.S. PATENT DOCUMENTS

| | | | |
|---|---|---|---|
| 2,967,171 | 1/1961 | Barnes et al. | 556/449 |
| 3,579,467 | 5/1971 | Brown | 252/46.3 |
| 4,185,140 | 1/1980 | Strella et al. | 428/418 |
| 4,248,825 | 2/1981 | Coon et al. | 106/287.14 |
| 4,430,235 | 2/1984 | Chu et al. | 252/49.6 |
| 4,519,927 | 5/1985 | Seiki | 252/49.6 |
| 4,840,743 | 6/1989 | Gardiner | 252/49.6 |
| 4,863,650 | 9/1989 | Kohler et al. | 106/38.22 |
| 4,889,677 | 12/1989 | Hashimoto et al. | 106/38.22 |
| 5,130,460 | 7/1992 | Kamei et al. | 556/449 |
| 5,138,012 | 8/1992 | Riding et al. | 556/449 |
| 5,314,947 | 5/1994 | Sawaragi | 106/287.16 |

FOREIGN PATENT DOCUMENTS

| | | | |
|---|---|---|---|
| 157499 | 9/1985 | European Pat. Off. . | |
| 159120 | 10/1985 | European Pat. Off. . | |
| 0355381A1 | 7/1989 | European Pat. Off. | 183/6 |
| 0423724A1 | 7/1989 | European Pat. Off. | 183/6 |
| 440476 | 7/1991 | European Pat. Off. . | |
| 570208 | 11/1993 | European Pat. Off. | 556/449 |
| 585046 | 3/1994 | European Pat. Off. | 556/449 |

OTHER PUBLICATIONS

1188561 Japan Abstract Jan. 1988.
5038808 Japan Abstract only.
218660 Japan Abstract Sep. 1986.

*Primary Examiner*—Jerry D. Johnson
*Attorney, Agent, or Firm*—Robert L. McKellar

[57] ABSTRACT

Lubricant compositions comprising at least one hydroxyphenyl-substituted polydiorganosiloxane and having an average phenol equivalent weight within a specific range exhibit excellent heat resistance, releasing characteristics, and lubricity, and are suitable for use as mold release agents, for achieving toner release in electrostatic copiers and as lubricants during false twisting of textile fibers.

7 Claims, No Drawings

ORGANOSILOXANE LUBRICANT COMPOSITIONS

REFERENCE TO RELATED APPLICATIONS

This application is a continuation-in-part of application Ser. No. 08/378,332, filed on Jan. 26, 1995.

BACKGROUND OF THE INVENTION

1. Field of the Invention

This invention relates to organosiloxane lubricant compositions. More particularly, this application relates to lubricant compositions containing a class of heat resistant liquid polydiorganosiloxanes that are uniquely suitable for use as mold release agents and lubricants for textile fibers.

2. Background Information

Because liquid polydiorganosiloxanes have good heat resistance and releasing characteristics, these materials have been widely used as mold-releasing agents during the molding of thermoplastic resins, thermosetting resins, and various rubbers, and as toner releasing agents for electrostatic copying machines. When liquid polydimethylsiloxanes, which are representative of the class of liquid polydiorganosiloxanes, are used as release agents for metal molds, they undergo a gradual thermal decomposition as the mold approaches about 150° C. This decomposition is more drastic at higher temperatures such as above 200° C., producing sticky gel-like materials. Because of this problem, when a liquid polydimethylsiloxane was used as a lubricant for an extended period of time as the mold-release agent, once in a while moldings having smooth surfaces could not be obtained due to accumulation of the gel-like substance. In particular, when the surface of the moldings are required to be as smooth as mirror finished surface, occurrence of the gel-like substance has been the fatal fault.

Also, in the high speed xerographic copiers, the heated roll is used at a high temperatures, typically about 200° C., and when liquid polydimethylsiloxanes are used as the toner releasing agent, their thermal decomposition presents a problem. In order to improve the productivity of molding or to shorten the copying time, the temperatures of the metal mold or the heated roll of the copier have recently tended to be raised even higher. Therefore, there has been a demand for releasing agents having improved heat resistance.

Mold-release agents consisting of a mercapto-functional liquid polydiorganosiloxane with a phenol oxidation inhibitor of specific structure are disclosed in Japanese Laid Open Application (Kokai) 61-218660. Amino group-containing liquid polydiorganosiloxanes with an amine equivalent within a specified range are described in Japanese Laid Open Application (Kokai) 3-227206.

As for the toner releasing agents, liquid polydiorganosiloxanes containing organofunctional groups such as carboxyl groups, hydroxyl groups, amino groups, and epoxy groups are described in Japanese Laid Open Patent Application (Kokai) 51-36141).

Because of their excellent heat resistance, similar types of liquid polydiorganosiloxanes are used as lubricants for various synthetic fibers such as lubricants during false twisting of textile fibers, and as lubricants for carbon fibers and tire cord fibers. Polydiorganosiloxanes used for these applications, such as amino group-containing polydiorganosiloxanes are described in Japanese Laid Open Patent Application (Kokai) 60-185879, 60-185880.

However, when these amino group-containing liquid polydiorganosiloxanes are applied during a heating process at temperatures above 300° C. as practiced in the thermosetting process of textile for the industrial tire cord or in the manufacturing process of carbon fiber, they occasionally emit a characteristic ammonia odor, discolor, or cause gelation during extended heating cycles, and therefore, are not completely satisfactory.

U.S. Pat. No. 5,138,012, which issued on Aug. 11, 1992, describes curable organosiloxane release coating compositions wherein at least one siloxane unit of the curable polyorganosiloxane contains a phenolic radical having from 6 to 25 carbon atoms. One of the carbon atoms on the phenyl ring of the phenolic radical is bonded to silicon by an alkylene radical.

The present inventors have found that certain non-reactive liquid hydroxyphenyl-substituted polydiorganosiloxanes having an average phenol equivalent weight within a specific range exhibit excellent heat resistance, releasing characteristics, and lubricity, and that all of the above-mentioned problems can be solved when these polymers are used in the applications discussed in the preceding paragraphs.

The objective of the present invention is to provide a class of liquid non-curable organosiloxane lubricant compositions exhibiting excellent heat resistance, releasing characteristics, and lubricity.

SUMMARY OF THE INVENTION

The objectives of the present invention are achieved using lubricant compositions comprising a polydiorganosiloxane containing no amino groups and a concentration of hydroxyphenyl groups within a specified range.

DETAILED DESCRIPTION OF THE INVENTION

The present invention provides non-curing lubricant compositions comprising at least one hydroxyphenyl group-containing polydiorganosiloxane that is free of amino groups and exhibits the general formula I

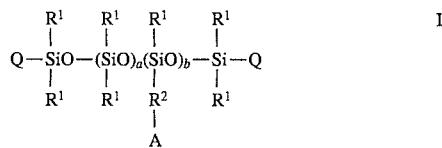

wherein each $R^1$ is individually selected from the group consisting of unsubstituted and substituted monovalent hydrocarbon radicals, $R^2$ represents an alkylene or alkylenearylene radical, A represents a hydroxyphenyl radical, Q is $R^1$ or $—R^2—A$, and a is a positive integer and b is 0 or a positive integer; and wherein said composition exhibits an average phenol equivalent weight of from 10,000–5,000,000 and a viscosity at 25° C. of from 10 to 100,000 centistokes ($mm^2$/sec).

The hydroxyphenyl-containing polydiorganosiloxanes constitute the active ingredient of the present compositions, and will be referred to hereinafter as ingredient A. These polydiorganosiloxanes can optionally be present in combination with other liquid polydiorganosiloxanes that do not contain hydroxyphenyl or amino groups, and which do not react with ingredient A to form crosslinked materials during storage and/or use of the present compositions. The hydroxyphenyl-free polyorganosiloxanes will be referred to hereinafter as ingredient B.

As used in this specification in connection with the present compositions and hydroxyphenyl-substituted polydiorganosiloxanes, the term "average phenol equivalent weight" refers to the weight in grams of the present composition or hydroxyphenyl-substituted phenol that contains one mole (gram molecular weight) of hydroxyphenyl radical.

When the average phenol equivalent weight of the present compositions is lower than 10,000, intermolecular bonding at high temperature increases and the composition tends to gel at relatively low temperatures. When the average phenol equivalent of the composition exceeds 5,000,000, the improved heat resistance imparted by the hydroxyphenyl groups may not be evident.

The average phenol equivalent weight of the present compositions is preferably from 50,000 to 2,000,000, and their viscosity is preferably from 10–50,000 centistokes (mm²/sec). A requirement of all polydiorganosiloxanes present in the compositions of this invention is that they not contain amino groups.

The hydroxyphenyl groups present in ingredient A of the present compositions are bonded to a silicon atom of the polydiorganosiloxane molecule through the divalent hydrocarbon radical represented by $R^2$ in formula I.

$R^2$ represents a divalent hydrocarbon radical that includes alkylene radicals such as ethylene, propylene, butylene, and isobutylene and alkylenearylene radicals of the formula —$(CH_2)_2$—$C_6H_4$—. Ethylene is preferred for the alkylene portion of this radical. The hydroxyl group of the hydroxyphenyl radical can be bonded at in the ortho, meta, or para position on the phenyl radical. The hydroxyphenyl radical can be located on a terminal or both terminals or non-terminal silicon atom of the polyorganosiloxane, or at both of these positions.

The silicon-bonded hydrocarbon radicals other than hydroxyphenyl that can represented by $R^1$ in formula I include but are not limited to alkyl such as methyl, ethyl, propyl, hexyl and octyl; alkenyl radicals such as vinyl, allyl, and hexenyl; aryl such as phenyl; aralkyl; alkaryl such as 2-phenylpropyl, halogenated monovalent hydrocarbon radicals such as chloromethyl and 3,3,3-trifluoropropyl; and other substituted monovalent hydrocarbon radicals. The substituted hydrocarbon radicals that can be present as $R^1$ include but are not limited to carboxyl-group-containing monovalent hydrocarbon radicals of the formula —$(CH_2)_x$COOH wherein x is an integer with a value of at least 1; hydroxy-containing monovalent hydrocarbon radicals of the formula —$(CH_2)_x$OH; oxyalkylene-containing radicals of the formula —$(CH_2)_x(C_2H_4O)_2H$; and mercapto-containing hydrocarbon radicals of the formula —$(CH_2)_x$SH. The only limitation on substituents that can be present on $R^1$ is that they not react during storage or use of the present compositions to cause crosslinking.

The hydrocarbon radicals represented by $R^1$ are preferably methyl.

The polydiorganosiloxanes referred to as ingredient A can be prepared by the addition reaction of a vinylphenol or an allylphenol with a polydiorganosiloxane containing at least one silicon-bonded hydrogen atom per molecule. The reaction is conducted in the presence of a platinum group metal-containing addition reaction catalyst such as chloroplatinic acid.

Ingredient A improves the heat resistance and inhibits the viscosity increase and gelation that occur during heating of the composition. This ingredient must contain at least one hydroxyphenyl radical in a molecule and should not contain amino groups.

Ingredient A can be easily manufactured by, for example, the addition reaction of a vinylphenol or allylphenol with a polydiorganosiloxane containing silicon-bonded hydrogen atoms. The reaction is conducted in the presence of a hydrosilation reaction catalyst such as chloroplatinic acid.

In the present compositions ingredient A can be used alone or one or more polydiorganosiloxanes corresponding to ingredient A can be combined with at least one additional polydiorganosiloxane which does not contain either hydroxyphenyl or amino groups, and will be referred to hereinafter as ingredient B. Mixtures containing these two types of polydiorganosiloxanes can be manufactured by, for example, including a polydiorganosiloxane which does not react with a vinylphenol or allylphenol in the reaction mixture used to prepare the hydroxyphenyl-containing polymer.

Mixtures of ingredients A and B can also be prepared by blending a previously prepared hydroxyphenyl-containing polydiorganosiloxane with one or more polydiorganosiloxanes that do not contain hydroxyphenyl groups.

When the present compositions are mixtures of at least one hydroxyphenyl-containing polydiorganosiloxanes corresponding to ingredient A and at least one polydiorganosiloxane that does not contain hydroxyphenyl radicals (ingredient B), the combined average phenol equivalent weight of all polydiorganosiloxanes constituting ingredient A is typically from 500 to 8,000, preferably from 1,000 to 5,000, and the viscosity of this ingredient is typically from 20 to 50,000 centistokes (mm²/sec), preferably from 50 to 10,000 mm²/sec.

Ingredient A is blended with a quantity of ingredient B sufficient to increase the phenol equivalent weight of the resultant mixture to the range of from 10,000 to 5,000,000 that characterizes the compositions of this invention.

Ingredient B can be represented by the general formula

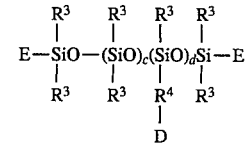

In this formula, $R^3$ is selected from the same group of monovalent unsubstituted and substituted hydrocarbon radicals represented by $R^1$ $R^4$ is a divalent hydrocarbon radical D represents a phenyl radical or a monovalent organic group selected from the group consisting of amide groups of the formula —NHC(O)$CH_3$, the carboxyl group, the hydroxyl group, oxyalkylene groups of the formula —$(C_2H_4O)_2H$ and mercapto groups, E is $R^3$ or —$R^4$—D, c is an integer with a value of at least 1 and d is 0 or an integer with a value of at least 1. The only proviso regarding the organic groups represented by D in the preceding formula is that they not react with the hydroxyphenyl group in ingredient A to form crosslinked materials during storage and/or use of the present compositions.

At least one of the $R^3$ substituents on each silicon atom of ingredient B is preferably a methyl radical.

Examples of hydroxyphenyl-free polydiorganosiloxane suitable for use as ingredient B include but are not limited to polydimethylsiloxanes, dimethylsiloxane-methylethylsiloxane copolymers, dimethylsiloxane-methylvinylsiloxane copolymers, dimethylsiloxane-methylphenylsiloxane copolymers, dimethylsiloxane-diphenylsiloxane copolymers, dimethylsiloxane-methyldodecenylsiloxane copolymers, methyldodecenylsiloxane/methyltetradecenylsiloxane copolymers, and polydiorganosiloxanes expressed by the formula:

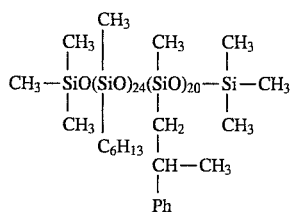

where Ph represents a phenyl radical.

The viscosity of ingredient B, measured at 25° C., is usually in the range of 10–100,000 centistokes (mm$^2$/sec).

Mixtures comprising ingredient A and B can be prepared by mixing the specified amounts of these two ingredients uniformly at room temperature. For example, when 10 parts by weight of a polydiorganosiloxane corresponding to ingredient A exhibiting an average phenol equivalent weight of 2,000 is blended with 90 parts of a polydiorganosiloxane corresponding to ingredient B and mixed uniformly, a lubricant composition exhibiting an average phenol equivalent weight of 20,000 is obtained.

When 10 parts by weight of a polydiorganosiloxane with an average phenol equivalent weight of 2,000 corresponding to ingredient A is added to 990 parts by weight of a polydiorganosiloxane corresponding to ingredient B and mixed uniformly, a hydroxyphenyl-substituted polydiorganosiloxane having an average phenol equivalent 200,000 is obtained.

The concentration of hydroxyphenyl-containing polydiorganosiloxane(s) (ingredient A) in mixtures with hydroxyphenyl-free polydiorganosiloxanes (ingredient B) is usually in the range of 0,001–1000 parts by weight of ingredient A for each 100 parts by weight of ingredient B.

While ingredient A is the active lubricating agent in mold release compositions containing this ingredient, as long as the objectives of the present invention are not impaired, this polydiorganosiloxane can be compounded with inorganic powders such as mica, talc, zinc oxide, and calcium carbonate; organic compounds such as paraffin and wax; organic solvents such as toluene, xylene, hexane, heptane, 1,1,1-trichloroethane, and 1,1,2,2-tetrachloroethane; non-ionic surfactants such as polyoxyalkylenealkylethers, polyoxyalkylenealkylphenylethers, polyoxyalkylenealkylesters, polyoxyalkylenesorbitanalkylesters, sorbitanalkylesters, polyethylene glycol and polypropylene glycol; cationic surfactants such as octyltrimethylammonium hydroxide, dodecyltrimethylammonium hydroxide, hexadecyltrimethylammonium hydroxide, octyldimethylbenzylammonium hydroxide, decyldimethylammonium hydroxide, didodecyldimethylammonium hydroxide, dioctadecyldimethylammonium hydroxide, beef tallow trimethylammonium hydroxide, or coconut oil trimethylammonium hydroxide; or anionic surfactants such as dodecylbenzene sulfonate, and higher alcohol sulfate esters.

The excellent heat resistance of the present lubricating agents make them suitable for use as mold-release agents for plastics and rubber, as toner releasing agents used in copying machines, as lubricants during processing of synthetic fibers, including textile fibers, carbon fibers and tire cord fibers, and as a lubricant applied prior to false twisting in textile treatment, as a lubricating agent for carbon fiber and tire cord fiber, and as a heat exchange medium.

When the present compositions are used as mold release agents, the hydroxyphenyl-substituted polydiorganosiloxane is diluted using an organic solvent such as toluene or xylene, or emulsified using various surfactants and water and then further diluted with water, following which a small amount is sprayed on to the mold in a uniform manner.

To prepare the emulsion, from 5 to 30 parts by weight of a surfactant are blended with 100 parts by weight of at least one of the present hydroxyphenyl-substituted polydiorganosiloxanes. The emulsion is then blended to achieve a concentration of the polydiorganosiloxane in the final composition of from 5 to 60 weight %, preferably from 10 to 50 weight %.

When the present lubricant compositions are used as toner releasing agents, the hydroxyphenyl-substituted polydiorganosiloxane (ingredient A) is often used in an undiluted form.

When the present lubricants-are used as lubricants for synthetic fibers, ingredient A is either used undiluted, as a solution in one or more organic solvent, or as an emulsion prepared using a surfactant and water. When used in an undiluted form, ingredient A is coated uniformly on the fibrous material using, for example, a roller.

The fibrous material can be a continuous filament, spun yarn, or tow. When used in the form of an emulsion, the lubricant composition is generally coated on the fibrous material by the kiss roll method, or by continuously passing yarn through the emulsion. In this case, the emulsion can be diluted with water. The amount of lubricant applied to the fiber is in the range of 0.2–2.0 weight percent.

EXAMPLES

The following examples describe preferred end use applications for the present lubricant compositions, and should not be interpreted as limiting the invention as defined in the accompanying claims. Unless otherwise specified all parts and percentages in the examples are by weight and viscosities are the values measured at 25° C.

Example 1

180 parts of a trimethylsiloxy-terminated polydimethylsiloxane (ingredient B) having a viscosity of 1000 centistokes (mm$^2$/sec.) was blended with 120 parts of a polydimethylsiloxane corresponding to the formula

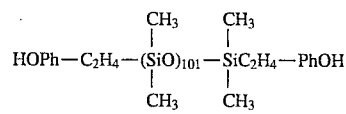

(ingredient A) and mixed to uniformity. In the formula HOPh— and —PhOH represent p—hydroxyphenyl, and the polymer exhibited a viscosity of 250 centistokes (mm$^2$/sec) and an average phenol equivalent weight of 3900. The resultant clear composition exhibited an average phenol equivalent weight of 10,000 and a viscosity of 575 centistokes (mm$^2$/sec). The viscosity change of this composition and the occurrence of gelation on the hot plate of the false twister were measured using the methods described below.

This lubricant was also coated on a tire cord fiber, following which the coefficients of static friction and kinetic friction between this fiber and the metal (SUS) were measured. These results are summarized in Table 1. The results of the evaluation of this lubricant as a lubricant for the false twisting of textile fibers are also recorded in Table 1.

Viscosity change 30 grams of the composition to be evaluated were placed in a 100 cc-capacity beaker. The beaker was then covered by a 300 cc-capacity beaker, and placed in a hot air circulating oven at 200° C. for heat treatment for specified times (50 hours, 100 hours, 200 hours, and 300 hours). After cooling, the viscosity of this hydroxyphenyl-substituted polydiorganosiloxane was measured using the E type rotational viscometer.

Occurrence of gelation on the hot plate of the false twister

A drop of the composition to be evaluated was placed on the hot plate of a false twister for woolly nylon. The hot plate was then heated in an oven at 300° C. for 30 hours. After the heat treatment, the plate was removed from the oven and any occurrence of gelation was noted.

Manufacturing of tire cord fiber 0.3 parts of the composition to be evaluated was dissolved in 99.7 parts of toluene. The resultant solution was coated on polyester tire cord fiber intended for use in the seat belt of an automobile to achieve a concentration of 0.3 weight %, based on the weight of the fiber. The fiber was then held at room temperature to evaporate the toluene.

Example 2

A clear polyorganosiloxane composition of the present invention with an average phenol equivalent of 50,000 and a viscosity of 840 centistokes ($mm^2$/sec) was prepared as described in Example 1 except that the amount of trimethylsiloxy-terminated polydimethylsiloxane (ingredient B) was 276 parts and the amount of dimethylpolysiloxane with the average phenol equivalent of 3900 (ingredient A) was 24 parts. The viscosity change and the occurrence of gelation on the hot plate of the false twister of the hydroxyphenyl-substituted polydiorganosiloxane were measured as described in Example 1. Also, for the tire cord fiber coated similarly to Example 1 with the same hydroxyphenyl-substituted polydiorganosiloxane, the coefficients of static friction and kinetic friction between this fiber and the metal(SUS) were measured. These results are summarized in Table 1. Furthermore, also noted in Table 1 is the overall evaluation of this hydroxyphenyl-substituted polydiorganosiloxane as the agent for false twisting in textile fiber treatment.

Example 3

A polyorganosiloxane composition with an average phenol equivalent of 200,000 and a viscosity 912 centistokes ($mm^2$/sec) was prepared as described in Example 1, with the exceptions that the amount of trimethylsiloxy-terminated hydroxyphenyl-free polydimethylsiloxane (ingredient B) was 288 parts and the amount of polydimethylsiloxane with an average phenol equivalent weight of 3900 (ingredient A) was 6 parts. The viscosity change and the occurrence of gelation on the hot plate of the false twister of the resultant mixture were measured as described in Example 1. Also, for a tire cord fiber coated as described in Example 1, the coefficients of static friction and kinetic friction between this fiber and the metal (SUS) were measured. These results are summarized in Table 1. Also recorded in Table 1 is the overall evaluation of this hydroxyphenyl-substituted polydiorganosiloxane as the oil agent for false twisting of textile fibers.

Example 4

A clear polyorganosiloxane composition with an average phenol equivalent weight of 2,000,000 and a viscosity of 997 centistokes ($mm^2$/sec), was prepared using the ingredients described in Example 1, with the exception that the amounts were 298 parts of the trimethylsiloxy-terminated polydimethylsiloxane (ingredient B) and 0.6 part of the polydimethylsiloxane of the average phenol equivalent weight of 3900 (ingredient A).

The viscosity change and the occurrence of gelation on the hot plate of the false twister of the resultant composition of this invention were measured using the methods described in Example 1. Also, for a tire cord fiber coated as described in Example 1, the coefficients of static friction and kinetic friction between this fiber and the metal (SUS) were measured. These results are summarized in Table 1. Also recorded in Table 1 is the overall evaluation of this hydroxyphenyl-substituted polydiorganosiloxane as the lubricating agent for false twisting of textile fibers.

Comparison Example 1

Using the methods described in Example 1, the viscosity change and the occurrence of gelation on the hot plate of the false twister for the trimethylsiloxy-terminated polydimethylsiloxane (ingredient B) described in Example 1 were evaluated. This polydimethylsiloxane was also used to coat tire cord and the coefficients of static friction and kinetic friction between this fiber and the metal (SUS) were measured. All of these results are summarized in Table 1 together with the evaluation of this polydimethylsiloxane as the lubricating agent for false twisting of textile fibers.

Comparison Example 2

The viscosity change and the occurrence of gelation on the hot plate of the false twister exhibited by the hydroxyphenyl-substituted polydimethylsiloxane (ingredient A) described in Example 1 in the absence of any trimethylsiloxy-terminated polydimethylsiloxane (ingredient B) were measured by the same methods as Example 1. Also, for the tire cord fiber coated as described in Example 1 with this hydroxyphenyl-substituted dimethylpolysiloxane, the coefficients of static. friction and kinetic friction between this fiber and the metal (SUS) were measured. These results are summarized in Table 1 together with the overall evaluation of this hydroxyphenyl-substituted dimethylpolysiloxane as the lubricating agent for false twisting of textile fibers.

Comparison Example 3

A polydiorganosiloxane composition with an average phenol equivalent of 10,000,000 and a viscosity of 1000 centistokes ($mm^2$/sec), was prepared using the ingredients and procedure of Example 1, with the exception that the amount of trimethylsiloxy-terminated polydimethylsiloxane (ingredient B) in Example 1 was changed to 299.88 parts and the amount of polydimethylsiloxane with an average phenol equivalent of 3900 (ingredient A) was changed to 0.12 part. The viscosity change and the occurrence of gelation on the hot plate of the false twister of the obtained hydroxyphenyl-substituted polydiorganosiloxane were measured using the same methods described in Example 1. Also, for the tire cord fiber coated similarly to Example 1 with the resultant hydroxyphenyl-substituted polydiorganosiloxane, the coefficients of static friction and kinetic friction between this fiber and the metal (SUS) were measured. These results are also summarized shown in Table 1 together with the overall evaluation of this hydroxyphenyl-substituted polydiorganosiloxane as a lubricating agent for false twisting textile treatment.

TABLE 1

| | Example 1 | Example 2 | Example 3 | Example 4 | Comparison Example 1 | Comparison Example 2 | Comparison Example 3 |
|---|---|---|---|---|---|---|---|
| Viscosity change (centistokes) | | | | | | | |
| 50 hours | 588 | 860 | 922 | 1020 | 1115 | 628 | 1020 |
| 100 hours | 658 | 900 | 955 | 1053 | 1306 | 8550 | 1232 |
| 200 hours | 831 | 922 | 989 | 1148 | 3483 | Not measurable | 2380 |
| 300 hours | 1504 | 1045 | 1033 | 1691 | Not measurable | Not measurable | Not measurable |
| Coefficient of static friction | 0.295 | 0.288 | 0.291 | 0.293 | 0.309 | 0.289 | 0.300 |
| Coefficient of kinetic friction | 0.239 | 0.234 | 0.235 | 0.239 | 0.244 | 0.233 | 0.238 |
| Occurrence of gelation on the hot plate of the false twister | Not gelled, and spread over the hot plate in liquid state | Not gelled, and spread over the hot plate in liquid state | Not gelled, and spread over the hot plate in liquid state | Not gelled, and spread over the hot plate in liquid state | Gelled, and the gelled substance stuck on the hot plate | Gelled, and the gelled substance stuck on the hot plate | Gelled, and the gelled substance stuck on the hot plate |
| Overall evaluation | Adequate | Adequate | Adequate | Adequate | Inadequate | Inadequate | Inadequate |

Note) "Not measurable" means that the viscosity could not be measured because of the pronounced gelation.

Example 5

90 parts of a phenyl group-containing diorganopolysiloxane (ingredient B) represented by the formula

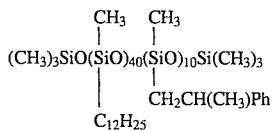

with a viscosity of 1010 centistokes (mm²/sec) and Ph representing a phenyl radical was blended with 10 parts of a 15 polydiorganosiloxane (ingredient A) represented by the formula

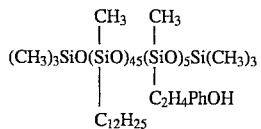

where PhOH represents o-hydroxyphenyl, the viscosity of ingredient A was 1022 centistokes (mm$^{2/sec.}$) and the average phenol equivalent weight was 2264. The resultant mixture exhibited an average phenol equivalent weight of 22,640 and a viscosity of 1017 centistokes (mm²/sec.)

The heat resistance, mold-releasing characteristics, and the surface condition of the moldings using this phenol group-containing diorganopolysiloxane were measured by the following methods. These results are summarized in Table 2 together with the results of the overall evaluation of this phenol group-containing diorganopolysiloxane as a mold-releasing agent. Heat Resistance Two grams of the hydroxyphenyl-containing diorganopolysiloxane were placed in an aluminum container, 5 cm in diameter and 2 cm deep, and held in the stream from a hot air dryer maintained at a temperature of 150° C. The appearance of the sample was evaluated after time intervals of 0.5 hour, 1 hour, 2 hours and 3 hours. The heat resistance was recorded using the following criteria:

G: Good (no viscosity increase at all, and no gelation observed.)

F: Fair (Thin surface film was formed, but the inside was fluid.)

P: Poor (Total gelation, the whole body became rubbery.)

Mold-releasing characteristics and surface condition of moldings

The hydroxyphenyl-containing diorganopolysiloxane was coated on an iron mold with a mirror surface finish used for molding rubber piece with dimensions of 25×25×0.5 cm, and heat-treated at 150° C. for 2 hours. After cooling, the mold was cleaned by soaking in a toluene bath and shaken lightly. This mold was then filled with unvulcanized styrene/butadiene copolymer rubber, and a molding was obtained by vulcanizing at 150° C. for 15 minutes under the pressure of 20 kg/cm². The mold-releasing behavior of this molding was measured and recorded as the mold-releasing characteristics.

The surface condition of the resultant molding was visually observed and measured whether the surface is mirror surface-like or rough. The molding was also examined to determine if any phenol group-containing diorganopolysiloxane was sticking to its surface.

Comparison Example 4

Using the methods described in Example 5 the heat resistance and mold-releasing characteristics of the phenyl group-containing diorganopolysiloxane with a viscosity of 1010 centistokes (mm²/sec) (ingredient B) described in Example 5 were measured together with the surface condition of the molding. The results are summarized in Table 2 together with the results of the overall evaluation of this phenyl group-containing diorganopolysiloxane as the mold-releasing agent.

Comparison Example 5

The heat resistance and mold-releasing characteristics of the diorganopolysiloxane with an average phenol equivalent weight of 2264 (ingredient A), described in Example 5, and the surface condition of the molding were measured by the same methods as Example 5. These results were shown in Table 2 together with the results of the overall evaluation of this phenol group-containing diorganopolysiloxane as a mold-releasing agent.

TABLE 2

|  | Example 5 | Comparison example 4 | Comparison example 5 |
|---|---|---|---|
| Heat resistance |  |  |  |
| 0.5 hour | G | F | F |
| 1 hour | G | P | F–P |
| 2 hours | G | P | P |
| 3 hours | G | P | P |
| Mold-releasing characteristics | Good | Good | Good |
| Surface condition of molding | As smooth as mirror surface, and glossy. The surface was coated uniformly with a small amount of phenol group-containing diorgano-polysiloxane. | Rough and not glossy. Gelled substance was sticking on the surface partially. | Rough and not glossy. Gelled substance was sticking on the surface partially. |
| Overall evaluation | Adequate | Inadequate | Inadequate |

Example 6

To 30 parts of the hydroxyphenyl-containing polydiorganosiloxane prepared as described in Example 3 and having an average phenol equivalent of 200,000 and a viscosity of 912 centistokes ($mm^2$/sec) (ingredient A) were added 3.5 parts of a polyoxyethylene(8.5 mole)-nonylphenolether, 0.5 parts of a polyoxyethylene(4.5 mole)-octylphenolether sulfate sodium salt and 66 parts of water. This mixture was emulsified using a colloid mill-type emulsifier.

The occurrence of gelation of the resultant emulsion on the hot plate of the false twister was evaluated using the method described in Example 3. The emulsion was also used to coat a tire cord fiber using the method described in Example 3, and the coefficients of static friction and kinetic friction between this fiber and the metal (SUS) were measured. These results are summarized in Table 3, together with the results of the evaluation of the emulsion as the agent for false twist in textile treatment is also noted in Table 3.

Comparison Example 6

To 30 parts of the trimethylsiloxy-terminated polydiorganosiloxane (ingredient B) used in Comparison Example 1, 3.5 parts of polyoxyethylene(8.5 mole)-nonylphenolether, 0.5 part of a polyoxyethylene(4.5 mole)-octylphenolether sulfate sodium salt, and 66 parts of water were added, and an emulsion was prepared by using colloid mill type emulsifier. The occurrence of gelation of the obtained emulsion on the hot plate of the false twister was measured by the same method as Comparison example 1. A tire cord fiber was coated with the emulsion using the method described in Comparison example 1, and the coefficients of static friction and kinetic friction between this fiber and the metal were measured. These results are summarized in Table 3 together with the results of the overall evaluation of this emulsion as the agent for false twist in textile treatment.

TABLE 3

|  | Example 6 | Comparison example 6 |
|---|---|---|
| Coefficient of static friction | 0.289 | 0.312 |
| Coefficient of kinetic friction | 0.238 | 0.246 |
| Occurrence of gelation on the hot plate of the false twister | Not gelled at all, and spread over the hot plate in liquid state | Gelled, and the gelled substance stuck on the hot plate |
| Overall evaluation | Adequate | Inadequate |

Example 7

Two drops of the hydroxyphenyl-containing polydiorganosiloxane (ingredient A) described in Example 1 with an average phenol equivalent weight of 10,000 and a viscosity of 575 centistokes ($mm^2$/sec.) were placed on a clean sheet of polyester film with dimensions of 21 cm by 30 cm and 100 μm thick. This polydiorganosiloxane was uniformly spread over the surface of the film using cotton gauze. After sprinkling 1.0 g of a black copier toner over the coated surface of the film, a sheet of white copier paper of A4 size was laid on top of it. The film and paper were then pressed for 5 minutes in a press under pressure of 5 Kg/$cm^2$ at a temperature of 110° C. The paper-film laminate was taken out of the press, and the polyester film and the copier paper were separated, and were found to separate easily without pressure. Also, the toner was totally transferred to the copier paper, and no sticking toner was observed on the surface of the film.

The results of this evaluation demonstrated that this hydroxyphenyl-containing polydiorganosiloxane is suitable for use as a toner releasing agent.

Comparison Example 7

A toner-coated polyester film and sheet of white copier paper were pressed together under the conditions described in Example 7 with the exception that the film was not coated with a layer of the hydroxyphenyl-containing polydiorganosiloxane. After the paper/film laminated was removed from the press the paper could not be separated from the film without tearing the paper.

Example 8

Two grams of a hydroxyphenyl-containing polydimethylsiloxane having an average phenol equivalent of 500,000 and a viscosity 500 centistokes ($mm^2$/sec) (ingredient A) were placed in an aluminum container 5 cm in diameter and 2 cm deep, and held in a hot air dryer at 250° C. for the following time intervals: 5 hours, 10 hours, 20 hours and 50 hours. Following each interval the appearance of the polymer was evaluated. This hydroxyphenyl-containing polydimethylsiloxane barely showed a viscosity increase even after 50 hours, and no gelation was observed. The result of this evaluation indicated that the heat resistance of this hydroxyphenyl-containing dimethylpolysiloxane is good.

Comparison Example 8

The heat resistance of a hydroxyphenyl-containing polydimethylsiloxane with an average phenol equivalent weight of 300, which is below the limits of the present invention, and a viscosity of 500 centistokes ($mm^2$/sec) was measured by the same method as Example 8. This polymer completely gelled after 50 hours of heating, and the entire mass became rubbery. These results demonstrate that the heat resistance of this hydroxyphenyl-substituted polydimethylsiloxane is not good.

Comparison Example 9

The heat resistance of a hydroxyphenyl-containing polydimethylsiloxane with an average phenol equivalent weight of 300, which is above the limits of the present invention, and a viscosity of 500 centistokes (mm²/sec) was evaluated using the method described in Example 8. This oil completely gelled after 50 hours of heating and the entire mass became rubbery. By this result, it became clear that the heat resistance of this polydimethylsiloxane is not good.

That which is claimed is:

1. A non-curing lubricant composition comprising at least one hydroxyphenyl group-containing polydiorganosiloxane that is free of amino groups and exhibits the general formula I

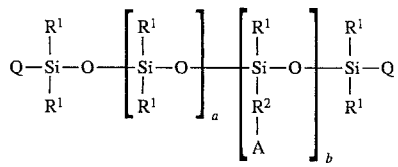

where each $R^1$ is individually selected from the group consisting of unsubstituted and substituted monovalent hydrocarbon radicals, $R^2$ represents an alkylene or alkylenearylene radical, A is selected from the group consisting of o-hydroxyphenyl and p-hydroxyphenyl, Q is $R^1$ or $-R^2-$A, and a is a positive integer and b is 0 or a positive integer with the proviso that when b is 0 at least one Q is $-R^2-$A; and wherein said composition exhibits an average phenol equivalent weight of from 10,000 to 5,000,000 and a viscosity at 25° C. of from 10 to 100,000 centistokes (mm²/sec).

2. A composition according to claim 1 wherein the viscosity of said composition is from 10 to 50,000 centistokes (mm²/sec);

the phenol equivalent weight of said composition is from 50,000 to 2,000,000;

$R^1$ is selected from the group consisting of alkyl, cycloalkyl, aryl, alkaryl, and aralkyl and substituted hydrocarbon radicals selected from the group consisting of halogenated monovalent hydrocarbon radicals, carboxyl-group-containing monovalent hydrocarbon radicals of the formula $-(CH_2)_xCOOH$, hydroxy-containing monovalent hydrocarbon radicals of the formula $-(CH_2)_xOH$, oxyalkylene-containing radicals of the formula $-(CH_2)_x(C_2H_4O)_2H$, and mercapto-containing hydrocarbon radicals of the formula $-(CH_2)_xSH$, wherein x is an integer with a value of at least 1; and $R^2$ is selected from the group consisting of ethylene, propylene, butylene, isobutylene and $-(CH_2)_2-C_6H_4-$.

3. A composition according to claim 2 wherein at least one $R^1$ substituent on each silicon atom is a methyl and $R^2$ represents ethylene.

4. A composition according to claim 1 wherein said composition comprises a mixture of
(A) from 0.001 to 1000 parts by weight of said polydiorganosiloxane as a first polydiorganosiloxane, and
(B) 100 parts by weight of a second polydiorganosiloxane that is essentially free of hydroxyphenyl radicals and amino groups, and wherein the average phenol equivalent weight of said first polydiorganosiloxane is from 500 to 8000 and the viscosity of said first polydiorganosiloxane is from 20 to 50,000 centistokes (mm²/sec).

5. A composition according to claim 4 wherein said second polydiorganosiloxane is represented by the formula

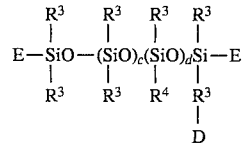

wherein $R^3$ is selected from the same group of monovalent unsubstituted and substituted hydrocarbon radicals represented by $R^1$, $R^4$ is a divalent hydrocarbon radical;

D represents a phenyl radical or a monovalent organic group selected from the group consisting of amide groups of the formula $-NHC(O)CH_3$, the carboxyl group, the hydroxyl group, oxyalkylene groups of the formula $-(C_2H_4O)_2H$ and mercapto groups, E is $R^3$ or $-R^4-D$;

c is an integer with a value of at least 1 and d is 0 or an integer with a value of at least 1;

with the proviso that the group represented by D does not react with the hydroxyphenyl group present in said first polydiorganosiloxane to form crosslinked materials during storage and/or use of said composition;

and wherein the average phenol equivalent weight of said first polydiorganosiloxane is from 1,000 to 5,000 and the viscosity at 25° C. of said first polydiorganosiloxane is from 50 to 10,000 centistokes (mm²/sec).

6. A composition according to claim 5 wherein at least one of the hydrocarbon radicals bonded to each of the silicon atoms of said first and second polyorganosiloxanes is a methyl radical;

the viscosity of said second polydiorganosiloxane is from 10 to 10,000 centistokes (mm²/sec);

and the concentration of said first polydiorganosiloxane in said composition is from 0.001 to 1000 parts by weight per 100 parts of said second polydiorganosiloxane.

7. A composition according to claim 6 wherein said second polydiorganosiloxane is a trimethylsiloxy-terminated polydimethylsiloxane, $R^2$ represents ethylene and A represents o-hydroxyphenyl or p-hydroxyphenyl.

* * * * *